W. BARTHOLOMEW.
LUBRICATOR FOR STEP BEARINGS FOR EXTRACTORS.
APPLICATION FILED SEPT. 15, 1920.
1,437,486.   Patented Dec. 5, 1922.
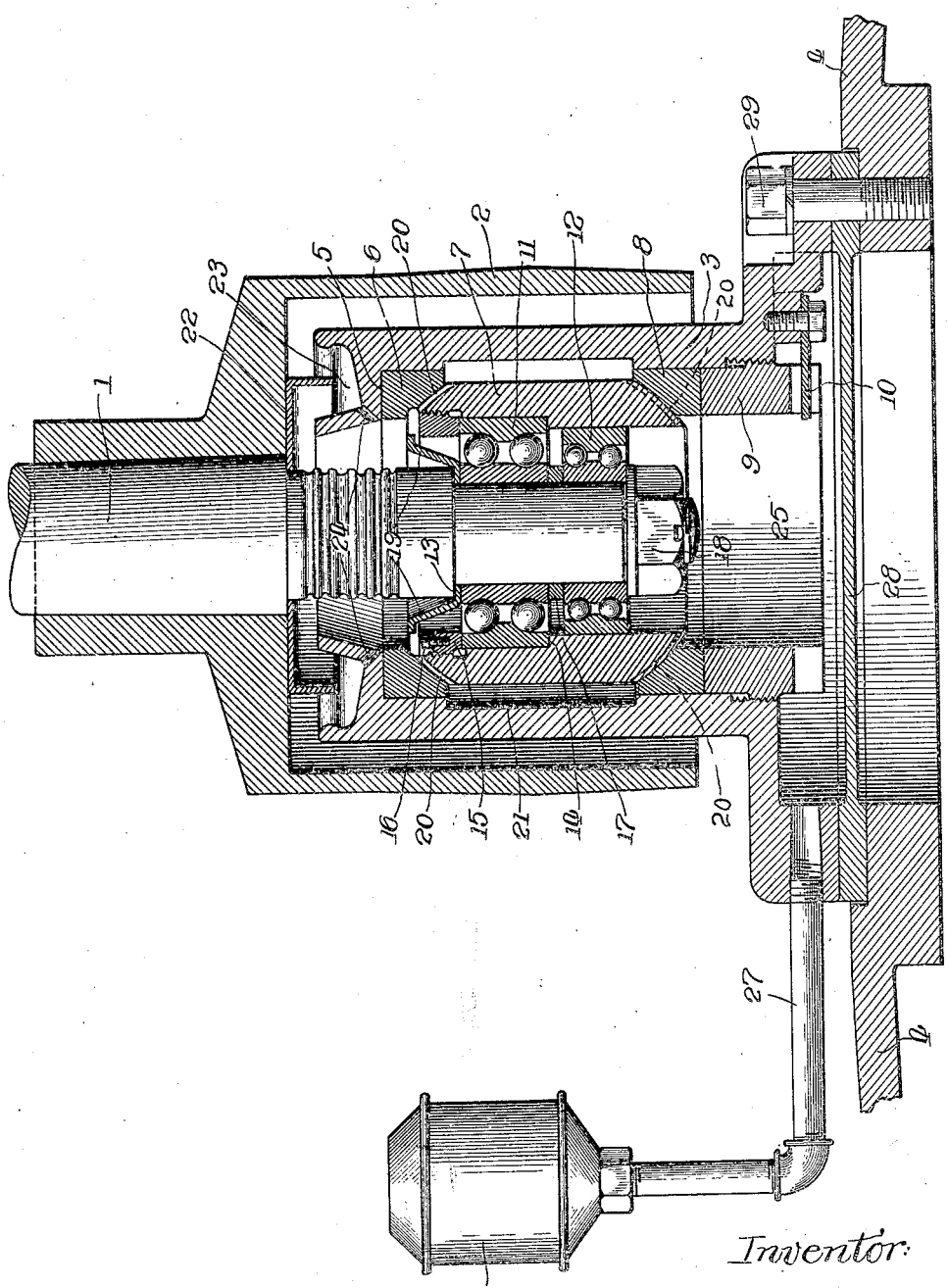
Witness:
A. J. Sauser.
Inventor:
William Bartholomew,
By Wilkinson, Huxley, Byron & Knight
Attys.

Patented Dec. 5, 1922.

1,437,486

UNITED STATES PATENT OFFICE.

WILLIAM BARTHOLOMEW, OF CHICAGO, ILLINOIS, ASSIGNOR TO TROY LAUNDRY MACHINERY COMPANY, LTD., OF CHICAGO, ILLINOIS, A CORPORATION OF NEW YORK.

LUBRICATOR FOR STEP BEARINGS FOR EXTRACTORS.

Application filed September 15, 1920. Serial No. 410,431.

*To all whom it may concern:*

Be it known that I, WILLIAM BARTHOLOMEW, a citizen of the United States, residing at Chicago, in the county of Cook and State of Illinois, have invented certain new and useful Improvements in Lubricators for Step Bearings for Extractors, of which the following is a specification.

This invention relates to lubricating devices for the step bearings of centrifugal machines, and particularly to that type of such bearings which mount the lower end of the spindle in the universal joint through the medium of thrust and radial ball bearings.

The invention has for its object to provide means for freely supplying lubricant to the parts of the several bearings, from an internal source and in a manner that will permit the lubricant to circulate freely among the parts to be lubricated. Accordingly, the invention consists in constructing the housing of the bearing with a lower reservoir, connecting a lubricant cup with said reservoir to keep it filled with oil up to a predetermined level, and supporting the ball rings and bearing races in a manner to permit the oil so supplied to rise vertically around the parts and in such relation thereto as to cause the oil to flow freely through the bearings by the centrifugal action of the rotating parts; suitable deflectors being provided for catching the oil that flows beyond the bearings and draining channels, and ports being provided for collecting such oil and returning it to the reservoir.

In the accompanying drawings is shown a vertical axial section of the step bearing for the spindle of a centrifugal machine.

1 represents the spindle, 2 the bell shaped pulley mounted thereon, and 3 represents the housing of the bearing which is mounted upon the base or curb 4. The housing 3 is constructed with a shoulder 5 against which is seated the upper ball ring 6 that receives an upper zone of ball 7, while a lower zone of the ball is received in a lower ball ring 8 supported upon the ball ring adjusting sleeve 9 which is threaded in the lower end of the housing 3 and held against unscrewing by the key 10 which projects into the castellated crown of said sleeve. In addition to flexibly supporting the spindle 1, the ball 7 serves as a cage for the thrust bearing 11 and the radial bearing 12, into the former of which the spindle is stepped through means of its shoulder 13 and against the latter of which it bears radially. Thrust bearing 11 is supported on shoulder 14 of the cage ball 7 and is held down by means of the race lock nut 15 having set screw 16 to resist its unscrewing. A radial bearing 12 is supported beneath the thrust bearing 11, and against the interposed spacer ring 17, by means of the clamping nut 18 on the lower end of the spindle. The inner rings of the two ball bearings are pressed by the clamping nut 18 in vertical column against the shoulder 13 of the spindle. The outer ring of the radial bearing being without vertical restriction except through the medium of balls and the outer ring of the thrust bearing is sustained vertically in the cage ball 7.

19 represents an oil deflector positioned between the shoulder 13 and the inner ring of the thrust bearing 12 and this revolves with the spindle and has the effect of directing outwardly and toward the upper passageways 20, oil which rises under the centrifugal action of said deflector. Through said upper passages 20 the oil enters the provisional reservoir 21 defined by the spaced rings 6 and 8 the cage ball 7 and the housing 3 and keeps the stepping ball 7 and its rings 6 and 8 thoroughly lubricated. Some of the oil may rise even as high as the under side of the bell pulley, but in that event will be caught by the deflector 22 and directed downwardly into the trough 23, whence it will escape through the ports 24 back into the annular space around the bearings. From the provisional reservoir 21, oil may escape downwardly through lower ducts 20 into the bottom reservoir 25.

The construction of the housing 3 and the described method of supporting the parts within it are such as to leave an ample reservoir 25 beneath the end of the spindle and the open bottom construction of the ball permits oil to flow freely therefrom upward around the thrust and spindle bearings. Oil is kept in this reservoir and up to a predetermined level in the spaces among the bearing parts, by means of an oil cup 26 connected with said reservoir 25 through the tube 27. The cup 26 is elevated to insure the proper level of oil within the bearings and it will be adapted, by glass side walls, top window or otherwise, for convenient observation, so that the oil may at all times be kept supplied to the working parts in proper quantity.

By the centrifugal displacing action of the deflector 19 and the free entry of oil from bottom reservoir 25, a flushing and cleansing circulation will be kept up from reservoir 25 through bearings 11 and 12, through upper ducts 20 into the provisional reservoir 21, and through lower ducts 20 back to reservoir 25.

The reservoir 25 is closed at the bottom through means of the housing cover 28 held to the curb 4 by means of the same screws 29 which hold the housing to the curb. With this construction the interior of the housing 3 may be readily opened up and access to it had at any time.

I claim:

1. In a step bearing for centrifugal machines, the combination of a housing, a ball, spaced ball positioning rings supported by the side walls of said housing and leaving a central reservoir between them in the housing, a spindle stepped in said ball, and means supplying oil to said reservoir.

2. In a step bearing for centrifugal machines, a housing, a ball spaced within said housing, ball-receiving rings placed around and defining upper and lower limits of the space between the housing and ball, a reservoir below the ball, and a spindle stepped in the ball; said ball opening downward into the reservoir beneath it and having communication above with the space between the ball and housing.

3. In a step bearing for centrifugal machines, a housing, a ball spaced within said housing, ball-receiving rings placed around and defining upper and lower limits of the space between the housing and ball, a reservoir below the ball, and a spindle stepped in the ball; said ball opening downward into the reservoir beneath it and having communication above with the space between the ball and housing; and said spindle having a deflector which induces a flow of oil toward said communication.

4. In a step bearing for centrifugal machines, a spindle, a ball in which said spindle is stepped having a vertical opening therethrough, a housing provided with a reservoir beneath and delivering upwardly to the vertical opening through the ball and leaving a reservoir space surrounding the ball, ball-supporting rings mounted in the housing with vertical space between them defining upper and lower limits of said surrounding reservoir space, and means establishing communication between the last named space and the upper portion of the ball opening and between said space and said bottom reservoir.

5. In a step bearing for centrifugal machines, the combination of a housing, a ball and ball rings supported by the side walls of said housing, a spindle stepped in said ball and having a rotary bearing therein, a deflector carried by said spindle, and means for supplying oil to the housing.

6. In a step bearing for centrifugal machines, the combination of a housing, a ball and ball rings supported by the side walls of said housing, a spindle stepped in said ball and having a rotary bearing therein, a deflector carried by said spindle, and means for supplying oil to the housing; said housing being constructed with a reservoir between its wall and the ball and said deflector being adapted to divert oil into said reservoir.

7. In a step bearing for centrifugal machines, the combination of a housing, an upper ball ring in said housing, a ball, a lower ball ring sustaining said ball against said upper ball ring with the reservoir spaced between said ball and said housing, a spindle having rotary bearings in said ball, a deflector carried by said spindle and ducts receiving oil from said deflector and directing it into said reservoir space.

8. In a step bearing for centrifugal machines, the combination of a housing, a spindle projecting downwardly into said housing, an oil trough at the upper end of said housing surrounding said spindle and having ports through which it discharges into the housing, a deflector depending toward said trough and surrounding the spindle above said housing, bearings for said spindle within the housing, and means for maintaining a supply of oil in the housing.

9. In a step bearing for centrifugal machines, the combination of a base, a housing supported on said base and providing an oil tight reservoir, a ball ring adjusting sleeve threaded into the lower portion of said housing, a ball ring fitting said housing and supported on said sleeve, a ball supported on said ball ring, a spindle stepped in said ball and having rotary bearings therein, and means for supplying oil to said housing.

Signed at Chicago, Illinois, this 7th day of Sept., 1920.

WILLIAM BARTHOLOMEW.